(12) United States Patent
Buch (10) Patent No.: US 10,640,929 B2
(45) Date of Patent: May 5, 2020

(54) GROUND WATER FILTRATION SYSTEM

(71) Applicant: PaveDrain, LLC, Milwaukee, WI (US)

(72) Inventor: Douglas J. Buch, Greenfield, WI (US)

(73) Assignee: PaveDrain, LLC, Milwaukee, WI (US)

( * ) Notice: Subject to any disclaimer, the term of this patent is extended or adjusted under 35 U.S.C. 154(b) by 0 days.

(21) Appl. No.: 15/935,237

(22) Filed: Mar. 26, 2018

(65) Prior Publication Data

US 2018/0274182 A1 Sep. 27, 2018

Related U.S. Application Data

(60) Provisional application No. 62/476,360, filed on Mar. 24, 2017.

(51) Int. Cl.
| | | |
|---|---|---|
| *E01C 13/02* | (2006.01) | |
| *E03F 1/00* | (2006.01) | |
| *E01C 5/00* | (2006.01) | |
| *B01D 39/16* | (2006.01) | |
| *B01D 29/56* | (2006.01) | |
| *C02F 1/00* | (2006.01) | |
| *E01C 3/00* | (2006.01) | |
| *E01C 11/00* | (2006.01) | |
| *B01D 39/08* | (2006.01) | |
| *E01C 11/22* | (2006.01) | |

(Continued)

(52) U.S. Cl.
CPC .............. *E01C 5/003* (2013.01); *B01D 29/56* (2013.01); *B01D 39/083* (2013.01); *B01D 39/16* (2013.01); *C02F 1/004* (2013.01); *C02F 3/046* (2013.01); *E01C 3/003* (2013.01); *E01C 3/06* (2013.01); *E01C 5/00* (2013.01); *E01C 11/00* (2013.01); *E01C 11/225* (2013.01); *E01C 13/02* (2013.01); *E01F 5/00* (2013.01); *E03F 1/002* (2013.01); *E03F 5/101* (2013.01); *C02F 2103/001* (2013.01); *C02F 2103/06* (2013.01); *E01C 2201/16* (2013.01); *E01C 2201/20* (2013.01); *E01C 2201/202* (2013.01)

(58) Field of Classification Search
CPC . E03F 1/002; E03F 5/0404; E03F 5/10; E03F 5/101; E01C 11/224; E01C 11/225; E01C 11/226; E01C 13/02; E01C 2201/20; E01F 5/00
USPC ....... 210/747.3, 170.03; 404/2, 4, 27, 31, 71
See application file for complete search history.

(56) References Cited

U.S. PATENT DOCUMENTS

| 19,592 A | 3/1858 | Tewkesbury |
|---|---|---|
| 61,580 A | 1/1867 | Tarr |

(Continued)

FOREIGN PATENT DOCUMENTS

| DE | 10244929 A1 | 4/2003 |
|---|---|---|
| EP | 1803851 | * 7/2007 |

(Continued)

*Primary Examiner* — Christopher Upton
(74) *Attorney, Agent, or Firm* — Boyle Fredrickson, S.C.

(57) ABSTRACT

Systems and methods for a ground water filtration system are described. The ground water filtration system includes paver blocks designed to facilitate liquid seepage between the paver blocks and to route the seepage to a preferred area. A filter may be utilized to remove undesired particulates in the seepage prior to routing. The ground water filtration system additionally provides at least one layer of stone to facilitate flow direction of the seepage. At least one geogrid fabric is also provided to further enhance ground water filtration.

20 Claims, 7 Drawing Sheets

(51) Int. Cl.
*E01F 5/00* (2006.01)
*C02F 3/04* (2006.01)
*E01C 3/06* (2006.01)
*E03F 5/10* (2006.01)
*C02F 103/00* (2006.01)
*C02F 103/06* (2006.01)

(56) References Cited

U.S. PATENT DOCUMENTS

| | | | |
|---|---|---|---|
| 378,825 A | 2/1888 | Brannigan | |
| 379,926 A | 3/1888 | Anderson | |
| 572,762 A | 12/1896 | Landers | |
| 815,641 A | 3/1906 | Schoeneman | |
| 836,017 A | 11/1906 | Douglass | |
| 4,227,829 A | 10/1980 | Landry, Jr. | |
| 4,246,305 A | 1/1981 | Delattre | |
| 4,370,075 A | 1/1983 | Scales | |
| 4,375,928 A | 3/1983 | Crow et al. | |
| 4,564,311 A | 1/1986 | Scales | |
| 4,571,353 A | 2/1986 | Gable, Jr. | |
| 4,572,699 A | 2/1986 | Rinninger | |
| 4,719,738 A | 1/1988 | Lee | |
| 4,792,257 A | 12/1988 | Rinninger | |
| 5,159,801 A | 11/1992 | Schmidt | |
| 5,281,048 A | 1/1994 | Hagenah | |
| 5,484,230 A | 1/1996 | Rudloff | |
| 5,499,888 A | 3/1996 | Hawkes | |
| 5,533,827 A | 7/1996 | Scheiwiller | |
| 5,779,391 A | 7/1998 | Knight | |
| 5,797,698 A | 8/1998 | Barth et al. | |
| D399,577 S | 10/1998 | Scales | |
| 5,906,456 A | 5/1999 | Knight | |
| 5,921,710 A | 7/1999 | Scales | |
| 6,071,041 A | 6/2000 | Knight | |
| 6,146,051 A * | 11/2000 | Pratt | E03F 1/002 404/2 |
| 6,164,026 A | 12/2000 | Ehrenkrantz | |
| 6,416,253 B1 | 7/2002 | Wimp et al. | |
| 6,508,607 B1 | 1/2003 | Smith et al. | |
| 6,536,988 B2 | 3/2003 | Geiger | |
| 6,579,038 B1 | 6/2003 | McAllister et al. | |
| D482,801 S | 11/2003 | Dice et al. | |
| D504,957 S | 5/2005 | Dice et al. | |
| 6,939,077 B1 | 9/2005 | Hart | |
| D516,735 S | 3/2006 | Kees et al. | |
| 7,105,086 B2 * | 9/2006 | Saliba | E03F 5/0404 210/170.03 |
| 7,344,334 B2 | 3/2008 | Thorkelson | |
| D575,414 S | 8/2008 | Salerno | |
| D609,369 S | 2/2010 | Buch | |
| 8,152,997 B1 * | 4/2012 | Olson | E03F 1/002 210/170.03 |
| 8,251,607 B2 | 8/2012 | Buch | |
| 8,366,343 B2 | 2/2013 | Buch | |
| 8,459,896 B2 | 6/2013 | Buch | |
| 8,974,664 B2 * | 3/2015 | Beatt | E03F 1/002 210/170.03 |
| 2004/0067103 A1 * | 4/2004 | Hart | E01C 3/06 404/2 |
| 2005/0051480 A1 * | 3/2005 | Newman | E03F 1/002 210/615 |
| 2005/0055983 A1 | 3/2005 | Tomes | |
| 2012/0018363 A1 * | 1/2012 | Pomerleau | E03F 1/002 210/170.03 |
| 2013/0045049 A1 * | 2/2013 | Krzyzak | E01C 11/224 404/31 |
| 2014/0158597 A1 * | 6/2014 | Brush | E03F 5/0404 210/170.03 |

FOREIGN PATENT DOCUMENTS

| | | |
|---|---|---|
| GB | 2134561 A | 8/1984 |
| JP | 7197429 A | 8/1995 |
| WO | WO 2011/049253 * | 4/2011 |

* cited by examiner

GROUND WATER FILTRATION SYSTEM

CROSS-REFERENCE TO RELATED APPLICATIONS

This application claims benefit of U.S. Provisional Application No. 62/476,360, filed on Mar. 24, 2017, the entire contents of which are hereby expressly incorporated by reference into the present application.

BACKGROUND OF THE INVENTION

1. Field of the Invention

The present invention relates in general to the field of paving systems. More particularly, the present invention relates to a permeable paving system utilizing a ground water filtration system. Specifically, a preferred embodiment of the present invention relates to a permeable paving system utilizing a high filtration media and at least one geogrid fabric on at least one layer of stone to direct fluid seepage on the paving system to a desired runoff storage area.

2. Discussion of the Related Art

As is known to those skilled in the art, paving systems historically create a surface impervious to rain. The water that falls on the traditional impervious paved surface runs off the edge of the paving surface rather than being absorbed into the ground beneath the paved surface. It is recognized that an increasing number of paved surfaces and the subsequent storm water runoff from these paved surfaces contribute to lowered water tables and rising stream levels. Thus, it is a previously recognized problem with paving systems that storm water runoff needs to be effectively managed. In addition to rain, traditional impervious paved systems may be exposed to fluid spills and other pollutants that create large pools which need to be cleaned or removed from the paving system. The storm water runoff can carry debris, sedimentation, and other pollutants that can decrease the water quality.

Historically, it was known in the prior art to manage storm water using a curb and gutter system to guide storm water into sewer systems. More recently the storm water has been guided into detention basins to allow the water to be stored closer to the paved surface. Needless to say, it is desirable to provide a permeable pavement system allowing storm water to drain through the paving system and to be absorbed into the ground under the paving system, minimizing the need for any additional storm water management system.

However, certain sediments or dissolved contaminants may prove to be harmful to a sewer system. An example of a harmful sediment on a paved system is contaminated silts and sediments, or perhaps spilled fuel. Fuel can damage a sewer system and can be toxic to plants and wildlife, if drained to a reservoir. Therefore, it is desired to filter out contaminants on the permeable paving system prior to outflowing to a reservoir or holding area.

One recognized approach to solving the problem of being dependent on the subgrade and soil for infiltration involves the use of underground storage systems. These storage systems are typically made of plastic or steel and have several feet of aggregate dumped on top of them. In addition to the aggregate layer, a sand layer may be added or used for the benefit of additional filtration. A disadvantage of this approach is the inability to clean out the underground storage systems once they are filled with sedimentation and particulates from storm water runoff. Therefore, a preferred solution will manage the storm water runoff to improve infiltration of the water into any type of soil and, if it becomes necessary, will allow for sedimentation to be cleaned out from the water storage system.

It is known to those with skill in the art that a filter media may collect contamination within passing liquid, such as storm water, and remove any undesired sediments therefrom. For example, U.S. Pat. No. 6,106,706 discloses a filter apparatus for filtering storm water. While this filter can stop gross pollution, such as twigs, branches, or litter, this filtration system does not help to control the flow of the runoff liquid, nor does it help to control smaller sediments or liquid pollutants. Additional problems not addressed are dissolved contaminants, such as phosphorous or dissolved phosphorous in the runoff or fuel runoff entering the system in place of storm water.

What is needed therefore is a ground water filtration system to remove runoff to improve the water quality of this liquid into any type of soil. Further, what is also needed is a method or system to remove sediments from the runoff so as to have clean filtered waste entering a sewer system or reservoir. Heretofore, these requirements have not been fully met without incurring various disadvantages.

SUMMARY AND OBJECTS OF THE INVENTION

Consistent with the foregoing and in accordance with the invention as embodied and broadly described herein, a permeable pavement system and ground water filtration system are disclosed in suitable detail to enable one of ordinary skill in the art to make and use the invention. A primary object of the present invention is to permit water runoff to be cleared from an area. Another object of the invention is to permit filtration of the water runoff so as to produce clean outflow for a sewer system or reservoir or the like. Another object of the invention is to permit easy access to the filtration system so as to permit ease of replacement, repair, or maintenance of the ground water filtration system.

In accordance with a first aspect of the invention, a ground water filtration system includes a geogrid or geotextile fabric. This fabric contains and separates the runoff so as to control the direction of fluid flow, preferably, to an outflow area or reservoir. Other aspects utilize a hard clay soil which is preferably impervious so as to manage flow direction. Preferably, a plurality of tank or arched storage modules is integral with the geogrid or geotextile fabric or integral with the hard clay soil or other impervious material utilized. Preferably, the fluid flow is directed to an outflow pipe which receives the fluid and routes the fluid to a tank, reservoir, or the like, away from the ground water filtration system.

Above the geogrid or geotextile fabric is at least one layer of stone with a surface-to-air height ranging from a few inches to several feet, and preferably twenty-two to twenty-six inches. When properly compacted, the clean, angular stone layer provides a strong foundation and restricts shifting or any type of movement. Additionally, the stone acts as a natural filter, so as to eliminate large pollutants or gross contamination of the ground water filtration system.

In accordance with one aspect of the invention, a second geogrid or geotextile fabric is laid upon the stone. In another aspect, the second geogrid or geotextile fabric is not provided.

Resting upon the second geogrid or geotextile fabric, or upon the stone, if the second fabric is not utilized, is a permeable paving system having a plurality of blocks with each block having an upper surface, a lower surface generally parallel to and spaced apart from the upper surface, and a pair of parallel ducts extending horizontally through the block between the upper surface and the lower surface.

The ground water filtration system may additionally comprise an additional geogrid fabric, oriented perpendicular to the first geogrid or geotextile fabric. The additional fabric is spaced apart from the layer of stone and oriented parallel thereto, so as to create and define a cavity similar to a well. Within this cavity, is a filtration product adapted to remove or attract fine or dissolved materials within the runoff.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

Figure 1:
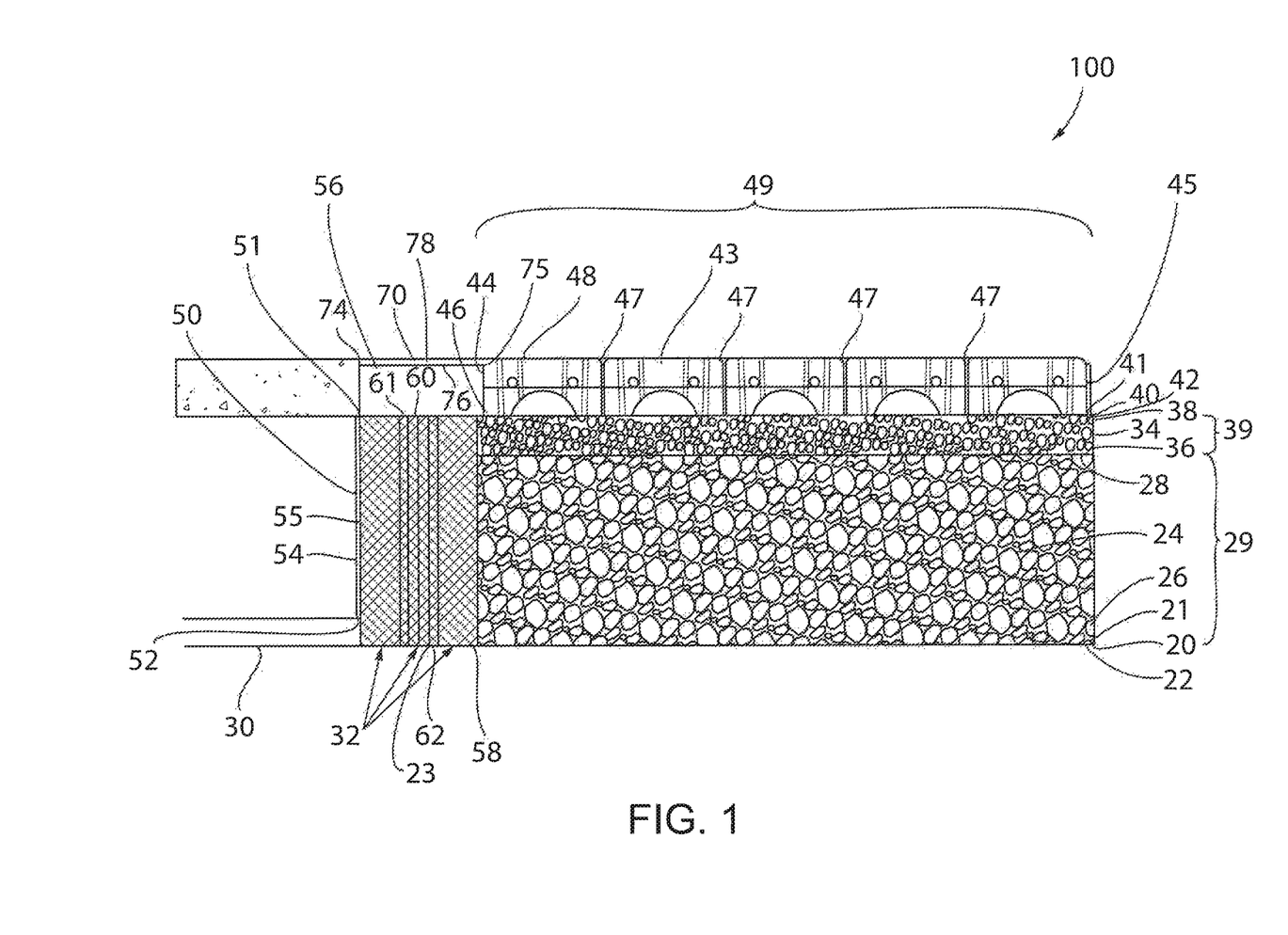
FIG. 1 is a sectional view of a first embodiment of a ground water filtration system.

Turning initially to FIG. 1, a preferred embodiment of a ground water filtration system 100 is illustrated. The base layer is a first geogrid fabric 20, which generally has a top side 21 and a bottom side 22. The first geogrid fabric 20 may alternatively be a geotextile fabric and stay within the spirit of the invention. It is contemplated that the geogrid fabric 20 may be manufactured out of multiple materials, but is preferably a polymeric material. The fabric may optionally utilize nanomaterials, which are known to be materials having particles in nanoscale dimensions or, alternatively, a material produced by nanotechnology. This provides greater strength-to-weight ratios and additionally increases neutralization of toxins. Another potential benefit to the geogrid fabric is the ability to capture pollutants and organic contaminants while allowing pass-through of water. In varying embodiments of the invention, the geogrid fabric may be permeable or non-permeable depending on the application of the system 100. For example, systems 100 used in applications such as, but not limited to, city streets may include a permeable geogrid fabric that separate the pollutants and organic contaminants from the water runoff while guiding the water runoff. In another example, systems 100 may be used in applications such as, but not limited to, gas stations and include a non-permeable geogrid fabric in order to contain the runoff saturated with liquid pollutants. Integral with the first geogrid fabric 20 is at least one tank module 32.

The tank module 32 is provided as additional storage for storm water or runoff. The modular tanks are primarily adapted for underground retention, infiltration, and recycling of runoff, storm water, or other liquid. The location of the tank modules is preferably integrated with the unused section of the first geogrid fabric within a cavity 58, which allows for the tank modules to later be accessed for removal, replacement, or maintenance. The tank modules may be a variety of different heights, widths, and lengths depending on the specific application thereof. By way of example, one potential tank module provides 2.3 cubic feet of volume up to a large size 20.34 cubic feet of volume. Naturally, the size and volume of the tank modules will vary depending on the design and use.

Located upon the top side 21 of the first geogrid fabric 20 is a first layer of stone 24 having a top side 28, a first side, a second side, and a bottom side 26, wherein the bottom side 26 rests upon the top side 21 of the first geogrid fabric 20. The first layer of stone 24 is laid in a manner away from the geogrid fabric 20 and, thus, encompasses a height 29 that provides a foundation for later use. The height 29 typically is between twelve inches to thirty inches, but it is contemplated that the height may vary from a few inches to several feet and stay within the concept of the present invention. The first layer of stone 24 may be any type of stone, but a preferred embodiment is 2 inch to 3 inch diameter clean, angular stone. One example of this is American Association of State Highway and Transportation Officials #2 or #3 stone. This is not a required stone size or measurement and is merely provided as an example of a stone that provides ample stability.

The bottom side of the first layer of stone 26 is placed upon a majority of the top side 21 of the geogrid fabric 20, but the first layer of stone 24 does not cover the entirety of the first geogrid fabric 20. The uncovered section 23 of the first geogrid fabric 20, which is not covered by the first layer of stone 24, is the basis of a cavity 58 wherein an outflow pipe 30 is situated.

The outflow pipe 30 is appropriate for lower infiltrating (i.e. clay) soils or overflow during large storm events. The outflow pipe 30 is adapted to receive liquid, such as storm water, and this can route said liquid to a holding tank, a reservoir, or the like. As such, the outflow pipe 30 moves liquid out of the ground water filtration system 100 and moves the liquid to a more desirable area. In one embodiment contemplated herein, an outflow pipe 30 is fitted with a flowmeter to indicate the flow rate of egressed liquid. The flowmeter (not depicted) allows for monitoring of the outflow rate going through the outflow pipe 30 without having to directly view the process.

A second layer of stone 34 having a top side 38, a first side, a second side, and a bottom side 36 resting on the top side of the first layer of stone 28 is utilized. The second layer of stone 34 encompasses approximately the same width as the first layer of stone 24 and having a general height 39 of approximately four to six inches, although the exact height of the second layer of stone 34 may vary from a few inches to several feet without departing from the spirit of the invention.

In certain embodiments of the invention the combination of the heights 29, 39 of the stone layers 24, 34 may total a few inches to several feet. For instance, the total combined height of the stone layers may be as small as 2 inches and as large as 10 feet. These two examples of the total combined height are merely exemplary and do not limit the total combined height of the stone layers as anticipated by the invention. In other embodiment of the invention, the combined height of the stone layers may be between 22 and 26 inches.

While the representative embodiment of the invention depicts two stone layers 24, 34, it is contemplated that various embodiments of the invention may use any number of one or more stone layers. As stated above, the combined height of the one or more stone layers may vary from a few inches to several feet.

A second geogrid fabric 40 having a top side 41 and a bottom side 42 may be extended horizontally across the top side of the second layer of stone 38. Resting on the top side of the second geogrid fabric 41 is a layer of blocks 49 forming a permeable paving system. The layer of blocks 49 is assembled out of a series of blocks 43, wherein each block 43 includes a first side 44, a second side 45, an upper surface 48, and a lower surface 46. The blocks 43 are preferably designed so as to have parallel ducts 47 extending horizontally through at least one of the blocks 43 and between the upper surface 48 and the lower surface 46 of the block(s) 43. This allows any liquid, such as storm water or runoff, to be egressed from the upper surface of the blocks 48, also known as the surface of the paving system, to the top side of the second geogrid fabric 40, wherein the liquid runoff may be directed toward the cavity 58 and eventually the outflow pipe 30 of the ground water filtration system 100.

In some embodiments, a third geogrid fabric 50 is utilized on a perpendicular plane with the first geogrid fabric 20 and on an opposite side of the cavity 58 from the first layer of stone 24 and the second layer of stone 34. This third geogrid fabric 50 contains a top side 51, a bottom side 52, a first side 54, and a second side 55. The second side of the third geogrid fabric 55 faces the first layer of stone 24 and the second layer of stone 34. Typically, the third geogrid fabric 50 rests above the outflow pipe 30, but depending on the design of the ground water filtration system 100, the outflow pipe 30 may be in different locations, and the third geogrid fabric 50 may be underneath or both above and beneath the outflow pipe 30. As used herein, when the bottom side of the third geogrid fabric 50 rests upon the top side of the outflow pipe 30, the outflow pipe 30 is said to be below the third geogrid fabric 50. Where the outflow pipe 30 rests upon the top side of the third geogrid fabric 51, the outflow pipe 30 is said to be above the third geogrid fabric 50. The top side third geogrid fabric 51 is generally on the same horizontal plane as the top side of the second layer of stone 38.

A filter 60 is preferably placed within the cavity 58 between the second side of the third geogrid fabric 50 and the first layer of stone 24 and second layer of stone 34. The filter 60 may be encased, such as within a plastic structure to protect the filter 60 from damage. The filter 60 may be encased by a variety of other material, such as geotextile fabrics or membranes, plastic or integral tank modules upon the exterior of the filter 60, or any other material desired without departing from the present invention. The filter 60 has a top side 61 and a bottom side 62, wherein the bottom side of the filter 62 typically rests upon an impervious membrane. The filter 60 is preferably adapted to be easily removed and replaced, for ease of maintenance or repair. One idea contemplated is to encompass a handle upon the top side of the filter 61. Another method contemplated is to utilize a device to loosen or grab the filter 60. The filter 60 may be a plethora of filtration products, as long as the filter 60 is able to remove or attract an amount of undesired particulates. Examples of acceptable filtration products contemplated are silts, sedimentation, iron, copper, cadmium, chromium, nickel, manganese, or other metals, asbestos, nitrogen, phosphorous, chlorides, polychlorinated biphenyls (PCBs), pesticides, and petroleum.

On a horizontal plane with the upper surface of the layer of blocks 48 of the permeable paving system is an access hatch 70. The access hatch 70 is contemplated as one of a variety of openings, such as a manhole cover, a grate, a storm drain, a gutter, or the like. The access hatch 70 comprises a first end 74, a second end 75, a bottom side 76, and a top side 78. The second end of the access hatch 75 rests against the first side of the layer of blocks 44. The top side of the access hatch 78 preferably is horizontally level with the upper surface of the layer of blocks 48, such that there is little to no grading change between the two. The access hatch bottom side 76 comprises the ceiling of the cavity 58 and encases the cavity 58 therein. The unoccupied area between the cavity 58 and the bottom side of the access hatch 76 is the additional void 56, which provides extra area from the filter top side 61. The access hatch 70 is preferably designed to be openable and removable, so as to provide access to the cavity 58 and the filter 60 and tank modules 32 therein.

In this manner, the entire ground water filtration system 100 is adaptable to be removable and replaceable from the filter 60 to the permeable paving system layer of blocks 49, as well as the tank modules 32 and any of geogrid fabrics 20, 40, 50, if necessary.

Figure 2:
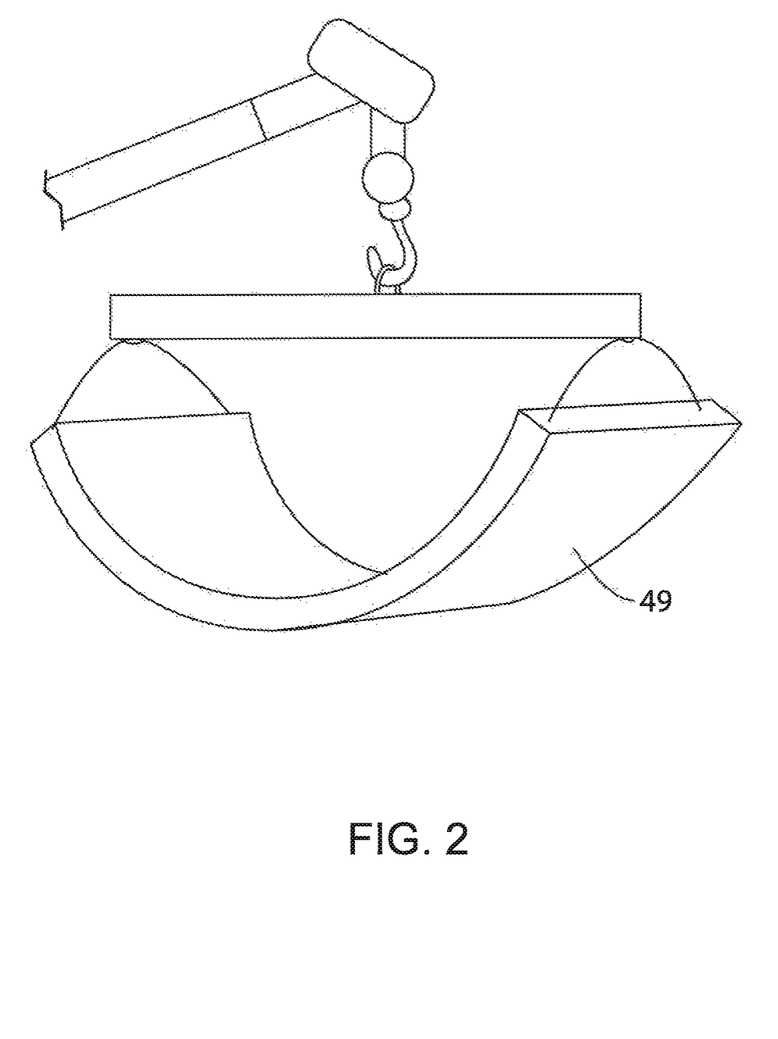
FIG. 2 is an exemplary embodiment of lifting a permeable paving unit.

Turning to FIG. 2, the permeable paving system layer of blocks 49 may be installed in an end-to-end configuration. One option contemplated is a modular design similar to the type of layer of blocks 49 shown so as to expedite the process.

Figure 3:
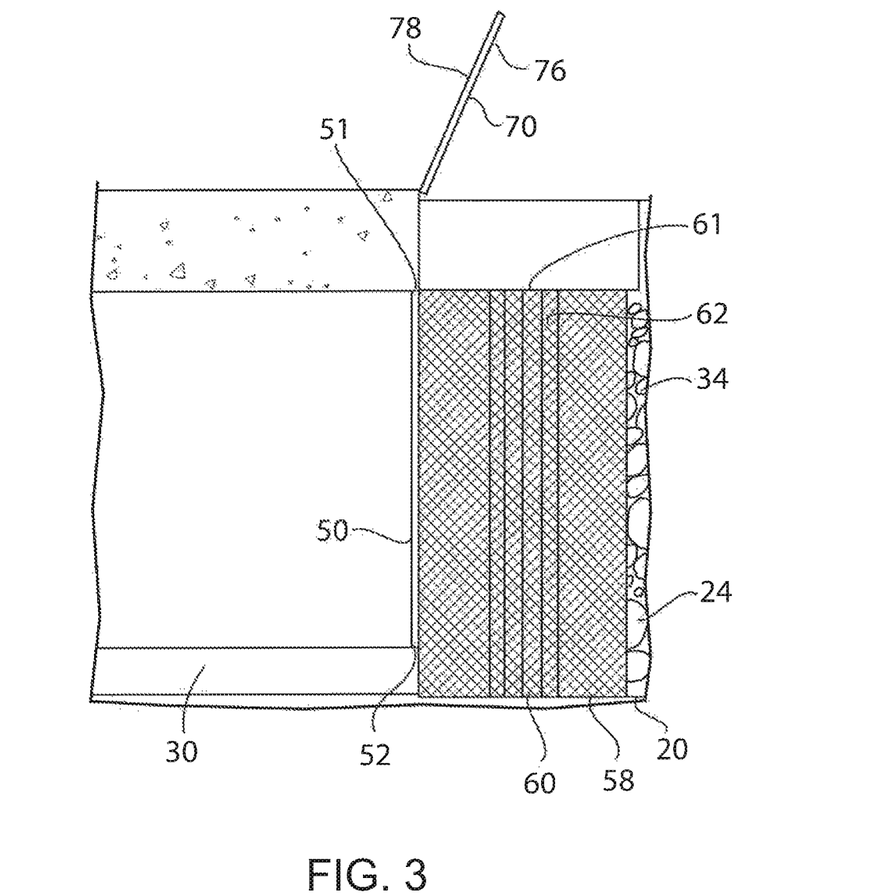
FIG. 3 is a perspective drawing of an embodiment of a ground water filtration system with an open access hatch and a filtration system being removed or replaced.

FIG. 3 depicts the process of opening the access hatch 70 and removing the filter 60 for routine maintenance or replacement.

Figure 4:
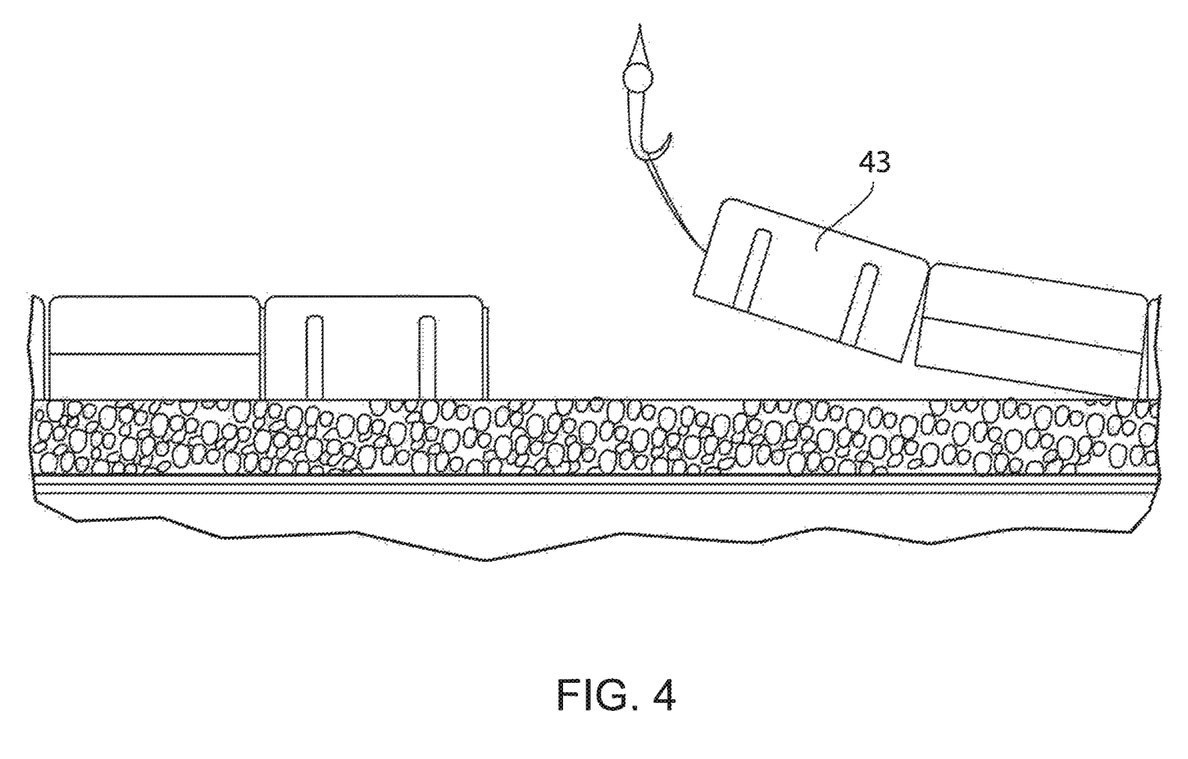
FIG. 4 is a perspective view of a permeable paving unit being placed in position.

Another option for setting the blocks in a layer is to utilize the method as shown in FIG. 4, where the blocks 43 are placed separately from each other in an individualized manner.

Figure 5:
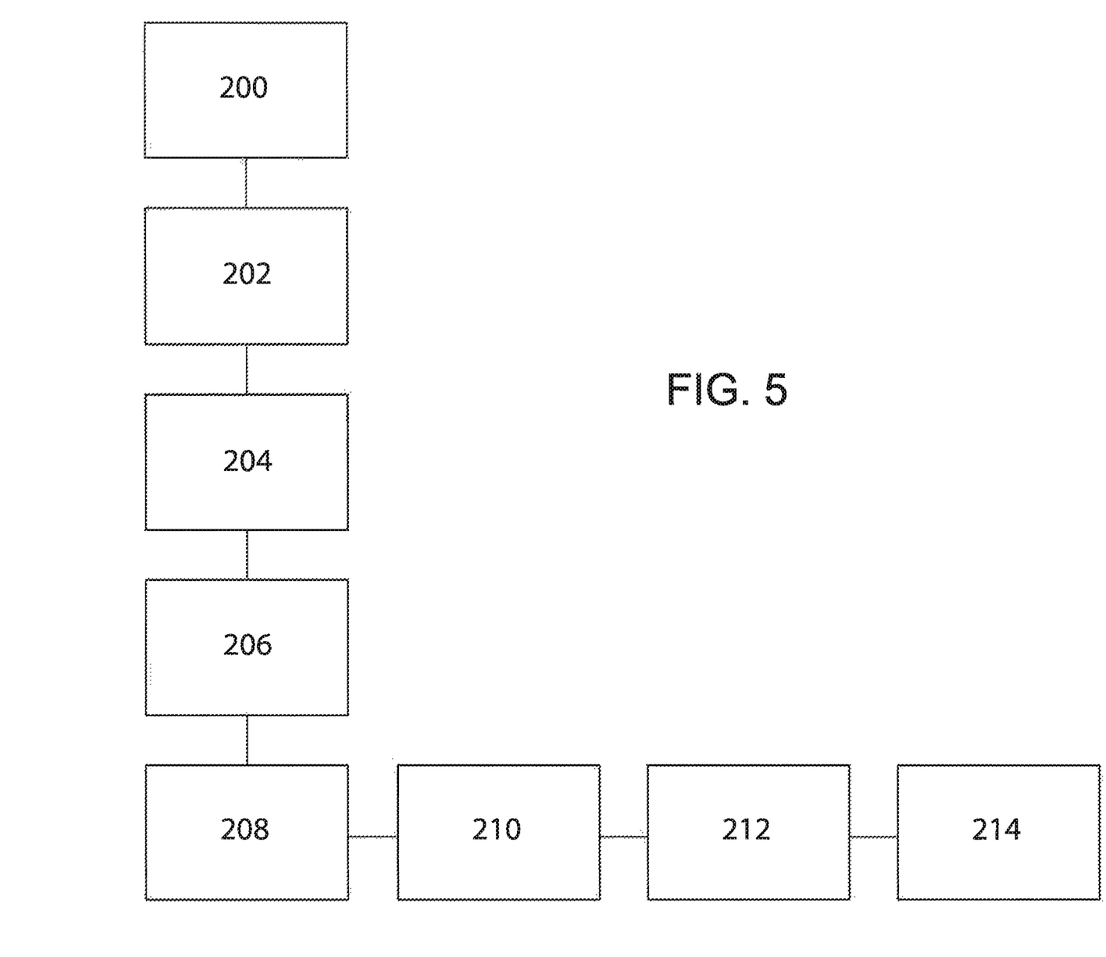
FIG. 5 is a flow chart describing the steps to install a ground water filtration system according to an embodiment of the invention.

Turning now to FIG. 5, the steps of assembling a ground water filtration system, according to one embodiment of the present invention, are described. First, a geogrid fabric or the like is laid down 200 horizontally on the ground. The majority of the geogrid fabric is then covered by a first layer of stone 202 leaving a portion of the geogrid fabric or the like uncovered. An outflow pipe is then laid on an edge of the geogrid fabric 204 which is not covered by the first layer of stone. The first layer of stone is then covered by a second layer of stone 206. After this second layer is placed, a second geogrid fabric or the like is placed upon the second layer of stone 208. A layer of blocks 210 is then laid and set upon the second geogrid fabric. Following this step, a filter is placed upon the uncovered section of the first geogrid fabric 212. Lastly, a cover is installed in the area above the filter 214 resting against a side edge of a block layer. Preferably, this provides a flat surface area from the cover across the layer of blocks.

Figure 6:
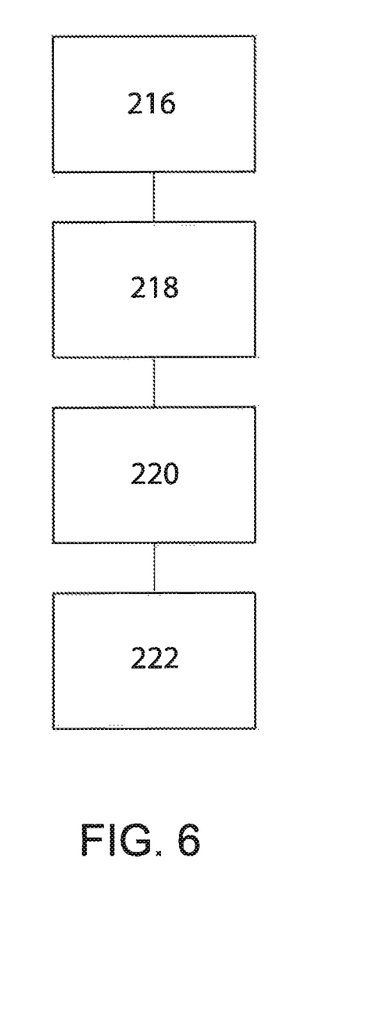
FIG. 6 is a flow chart describing the steps to replace the filter of a ground water filtration system according to an embodiment of the invention.

FIG. 6 discloses the steps, according to one embodiment, of accessing the filter component of the ground water filtration system either for repair, replacement, or maintenance. The first step is to open or remove the cover 216, also known as the access hatch, from its initial location, exposing the cavity and filter (not shown). Next, remove the filter from its position 218. Lastly, either cleaning the filter or replacing the filter 220 entirely allows for the return of a filter to the cavity 222.

Figure 7:
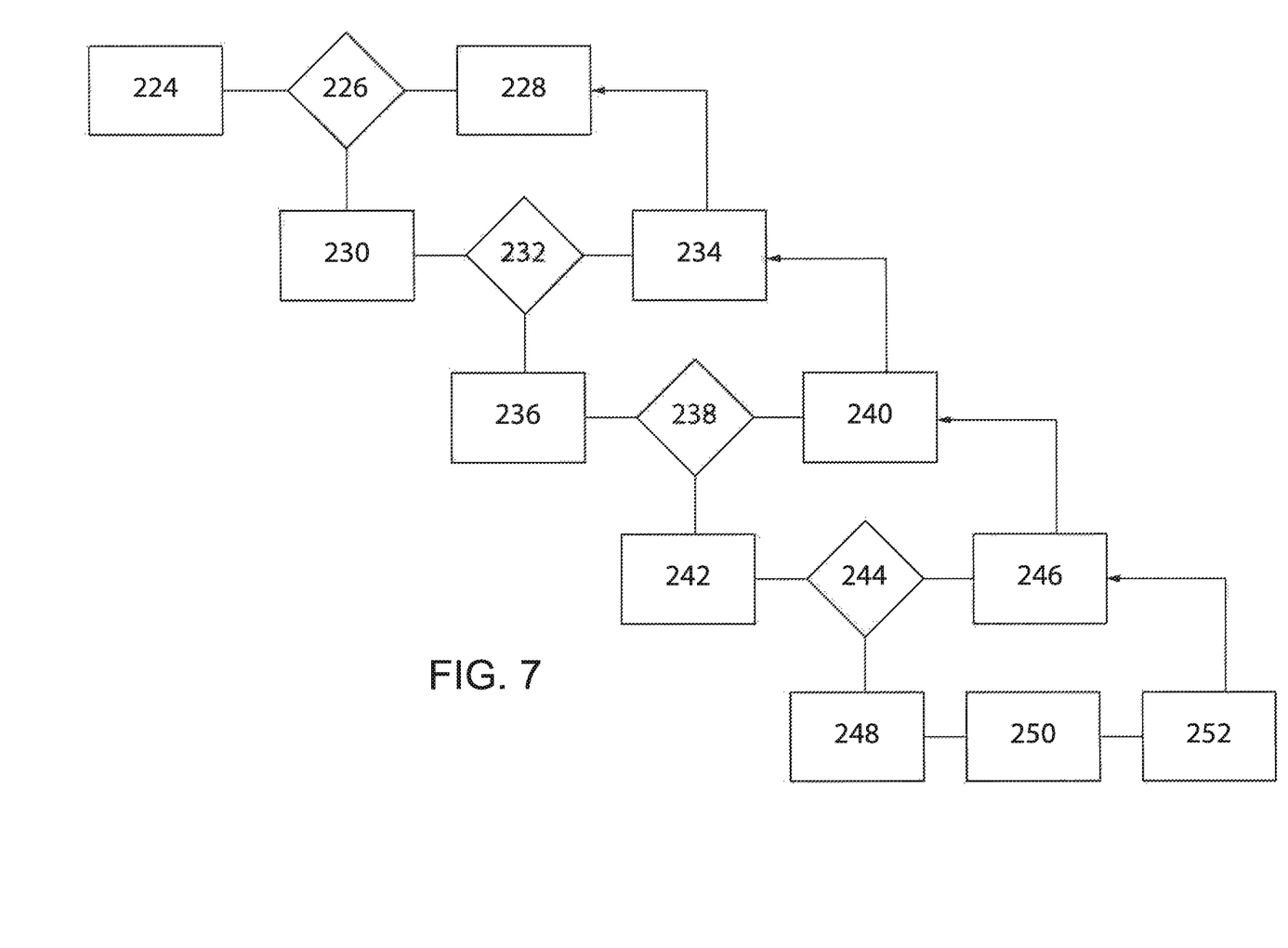
FIG. 7 is a flow chart describing the steps to replace components of a ground water filtration system according to an embodiment of the invention.

FIG. 7 depicts the steps required to replace different components of the ground water filtration system according to one embodiment of the present invention. First, the removal of the layer of permeable blocks 224 allows access to the underlying components. The next step is to remove and replace the layer of permeable blocks 226, if this is desired. If this is indeed desired, reinstall the permeable blocks 228. If replacement of permeable blocks is not yet desired, remove the second water filtering fabric, also known as geogrid fabric from its location 230. Replace the second water filtering fabric 232, if desired, and then reinstall the second water filtering fabric 234. After the second water filtering fabric is replaced, reinstall the permeable blocks 228. If the replacement of the second water filtering fabric is not desired, the next step is to remove the second layer of stone 236. The next step is to determine if the second layer of stone should be replaced 238. If this is to be replaced, the next step is to replace the second layer of stone 240. After the second layer of stone is replaced 240, the second water filtering fabric is to be reinstalled 234, and then reinstallation of the layer of permeable blocks is required 228. If the second layer of stone is not to be replaced, the next step is to remove the first layer of stone 242. After the first layer of stone is removed 242, a decision must be made about whether replacement of the first layer of stone is required 244. If it is required, replace the first layer of stone 246, reinstall the second layer of stone 240, reinstall the second water filtering fabric 234, and, finally, reinstall the layer of permeable blocks 228. If the decision is to not replace the first layer of stone, the next step is to remove the first water filtering fabric 248. The first water filtering fabric then may be replaced or have preventive maintenance performed on said first water filtering fabric 250. After this is completed, the first water filtering fabric may be reinstalled 252. After the first water filtering fabric is reinstalled 252, the next step is to reinstall the first layer of stone 246, then reinstall the second layer of stone 240, then reinstall the second water filtering fabric 234, and, finally, reinstall the layer of permeable blocks 228.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

For example, individual components of the disclosed block and paving unit need not be formed in the disclosed shapes, or assembled in the disclosed configuration, but could be provided in virtually any shape so as to provide a paver block/unit with the novel features, e.g., a cavity capable of storing fluid. Furthermore, all the disclosed features of each disclosed embodiment can be combined with, or substituted for, the disclosed features of every other disclosed embodiment except where such features are mutually exclusive.

It should also be noted that the first layer of stone preferably has a top side, a first side, a second side, and a bottom side, wherein the bottom side of the first layer of stone is in direct contact with the top side of the first geogrid fabric from the edge of the second end of the first geogrid fabric to a location between the first end and second end of the first geogrid fabric. Further, the first layer of stone is one of AASHTO #2 and AASHTO #3 stone and has a height of at least twelve inches to about thirty inches. The depth of the stone layers is largely dependent on the application and soil quality and may be adjusted accordingly. For example, in one application, the first layer of stone may be less than 6 inches, and in another, it may be several feet deep.

The second layer of stone preferably has a top side, a first side, a second side, and a bottom side, wherein the bottom side of the second layer is in direct contact with the top side of the first layer of stone. In this layer, the stone preferably consists of AASHTO #57 stone and has a height of at least four to about six inches. Again, the types of stone and the depth of this layer may also vary here depending on the application.

It is intended that the appended claims cover all such additions, modifications, and rearrangements. Expedient embodiments of the present invention are differentiated by the appended claims.

What is claimed is:

1. A ground water filtration system comprising:
   a first geogrid fabric having a first end, a second end, a top side, and a bottom side;
   a first layer of stone having a top side, a first side, a second side, and a bottom side, wherein the bottom side of the first layer of stone is in direct contact with the top side of the first geogrid fabric, wherein the second side of the first layer of stone is at the edge of the second end of the first geogrid fabric, and wherein the first side of the first layer of stone is at a location between the first end and second end of the first geogrid fabric;
   a plurality of tank modules integral with the first geogrid fabric and adjacent the first side of the first layer of stone;
   a second layer of stone having a top side, a first side, a second side, and a bottom side, wherein the bottom side of the second layer is in direct contact with the top side of the first layer of stone;

a second geogrid fabric having a top side and a bottom side, wherein the second geogrid fabric bottom side is in direct contact with the top side of the second layer of stone;

a permeable paving system disposed on the top side of the second geogrid fabric, the permeable paving system having a plurality of parallel ducts extending through the permeable paving system and between an upper surface of the permeable paving system and an lower surface of the permeable paving system, and wherein the lower surface of said plurality of blocks is in direct contact with the top side of the second geogrid fabric;

an outflow pipe fluidically coupled to the first stone layer.

2. The ground water filtration system of claim 1, further comprising a third geogrid fabric oriented perpendicular to the first and second geogrid fabrics and aligned with the first end of the first geogrid fabric, wherein the third geogrid fabric is spaced apart from the first side of the first stone layer and the first side of the second stone layer to form a cavity therebetween, wherein the third geogrid is in direct contact with the outflow pipe.

3. The ground water filtration system of claim 2, further comprising a media filter disposed within the cavity, above the top side of the first geo rid fabric, and between the third geogrid fabric and the first sides of the first and second stone layers, the media filter having a top side and a bottom side in proximity to the top side of the first geogrid fabric.

4. The ground water filtration system of claim 3, wherein the top side of the media filter is aligned with a top side of the third geogrid fabric and the top side of the second layer of stone.

5. The ground water filtration system of claim 4 wherein an egressed liquid from the upper surface of the permeable paving system directed through at least one of the layers of stone and toward the cavity by at least one of the geogrid fabrics and received by the outflow pipe.

6. The ground water filtration system of claim 3, wherein the plurality of tank modules is disposed within the cavity and encases the media filter.

7. The ground water filtration system of claim 1, further comprising an access hatch having a first end, a second end, a top side, and a bottom side, wherein the top side of the access hatch is aligned with the upper surface of the permeable paving system, and wherein the second end of the access hatch is in direct contact with the first side of the permeable paving system.

8. A water run off filtration system comprising:
a water flow directing layer;
a first layer of stone disposed on a portion of the water flow directing layer;
a second layer of stone disposed on top of the first layer of stone;
a container disposed on the water flow directing layer adjacent the first layer of stone;
a water filtering fabric disposed on top of the second layer of stone;
a layer of blocks on top of the water filtering fabric and including a means for joining at least two blocks in the layer;
an outflow pipe in fluid communication with at least one of the layers.

9. The water runoff filtration system of claim 8, wherein the water filtering fabric comprises nanotechnology geogrid fabric.

10. The water runoff filtration system of claim 8, wherein the container for retaining the fabric is a stormwater holding module.

11. The water runoff filtration system of claim 8, wherein the first layer of stone adjacent to the container comprises at least one of AASHTO #2 and #3 stone.

12. The water runoff filtration system of claim 8, wherein the second layer of stone comprises at least one of AASHTO #57 stone.

13. The water runoff filtration system of claim 8, wherein the layer of blocks are comprised of permeable paving blocks.

14. The water runoff filtration system of claim 8, wherein the water flow directing layer is comprised of clay.

15. The water runoff filtration system of claim 8, wherein the water flow directing layer is comprised of one of a geogrid and geotextile material.

16. The water runoff filtration system of claim 8, wherein the outflow pipe is in fluid communication with the container and the water flow directing layer.

17. A method of filtering runoff liquid from a paved area, comprising the steps of:
positioning a first water filtering fabric upon an earthen surface;
pouring a first layer of stone upon the first water filtering fabric;
wherein said first layer of stone conceals a majority portion of the first water filtering fabric;
placing an outflow pipe on a distal end of the first water filtering fabric not covered by the first layer of stone;
pouring a second layer of stone upon the entirety of the first layer of stone;
positioning a second water filtering fabric upon the second layer of stone;
setting a layer of permeable blocks upon the second water filtering fabric;
arranging a filter upon the first water filtering fabric at a location adjacent the distal end of the first water filtering fabric not covered by the first, layer of stone; and
installing a cover above said filter.

18. The method of claim 17, further comprising excavating a pit prior to positioning the first water filtering fabric.

19. The method of claim 17, further comprising opening the cover and removing said filter for one of replacement, repair, and maintenance.

20. The method of claim 17, further comprising removing the layer of permeable blocks, and replacing at least one of first layer of stone, second layer of stone, first water filtering fabric, second water filtering fabric, and layer of permeable blocks.

* * * * *